United States Patent
Moruzzi et al.

(10) Patent No.: US 10,310,487 B2
(45) Date of Patent: Jun. 4, 2019

(54) OPTIMAL FIBER PATH GENERATION METHOD FOR COMPOSITE PART MANUFACTURING

(71) Applicant: AUTODESK, INC., San Rafael, CA (US)

(72) Inventors: Massimiliano Moruzzi, Westwood, NJ (US); Michael Spellman, Rivervale, NJ (US); Gregory MacLean, Old Tappan, NJ (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 14/198,549

(22) Filed: Mar. 5, 2014

(65) Prior Publication Data

US 2018/0284724 A1    Oct. 4, 2018

Related U.S. Application Data

(60) Provisional application No. 61/772,548, filed on Mar. 5, 2013.

(51) Int. Cl.
| | | |
|---|---|---|
| *G05B 19/4099* | (2006.01) | |
| *B29C 70/38* | (2006.01) | |
| *G05B 19/4069* | (2006.01) | |

(52) U.S. Cl.
CPC ........ *G05B 19/4099* (2013.01); *B29C 70/382* (2013.01); *B29C 70/384* (2013.01); *B29C 70/386* (2013.01); *B29C 70/388* (2013.01); *G05B 19/4069* (2013.01); *G05B 2219/31412* (2013.01); *G05B 2219/31415* (2013.01); *G05B 2219/45238* (2013.01); *Y02P 80/40* (2015.11); *Y02P 90/265* (2015.11)

(58) Field of Classification Search
CPC ............ B65H 2557/25; B65H 2557/26; B65H 2557/262; B65H 2557/20; B65H 2557/25; G05B 19/4099; G05B 2219/31415; G05B 2219/45238; G05B 19/4069; G05B 2219/31412; B29C 70/386; B29C 70/382; B29C 70/388; B29C 70/384; Y02P 90/265; Y02P 80/40
USPC ..................... 700/29, 95, 114, 117, 119, 122
See application file for complete search history.

(56) References Cited

U.S. PATENT DOCUMENTS 8,315,837 B2 * 11/2012 Menayo ................. B29C 70/54
                                                            428/152

* cited by examiner

*Primary Examiner* — Vishal I Patel
(74) *Attorney, Agent, or Firm* — Ohlandt, Greeley, Ruggiero & Perle, L.L.P.

(57) ABSTRACT

A novel method designs and analyzes composite parts including optimal manufacturing strategies. The invention analyzes part design including curvatures and other surface topology to formulate an optimal strategy for material layup, number of plies, initial orientation angle, and towpath steering vectors. The method computes an optimum starting point for each fiber path and a stagger offset for each successive fiber path to as to eliminate or minimize gaps and overlaps between adjacent plies. Intermediate surfaces are generated by a polynomial discretization method which generates large computational time savings and enhances blending of adjacent zones to control surface smoothness. The method further calculates a variable steering path for the layer taking into account material parameters and limitations such that plies originating in the same location have a variable orientation angle and follow any reference curve generated by the method to maximize strength and minimize weight of the component.

2 Claims, 2 Drawing Sheets

OPTIMAL FIBER PATH GENERATION METHOD FOR COMPOSITE PART MANUFACTURING

CROSS REFERENCES TO RELATED APPLICATIONS

This non-provisional patent application claims a priority benefit to U.S. Provisional Application No. 61/772,548 entitled "Optimal fiber path generation method for composite part manufacturing" filed in the United States Patent and Trademark Office on Mar. 5, 2013 by a common Inventor to this instant application, Massimiliano Moruzzi. Further the above named Provisional Application is hereby incorporated by reference.

STATEMENT REGARDING FEDERALLY SPONSORED RESEARCH

Not Applicable

REFERENCE TO APPENDIX

Not Applicable

BACKGROUND OF THE INVENTION

The present invention relates to the design and manufacturing of composite parts. Parameters such as material type, surface topology, layup strategy, ply stacking, simple and complex part curvatures, tool head design, material feed speeds, towpath starting point, towpath initial point offset and or stagger, towpath angle of orientation, and generation of intermediate surfaces, are examples of parameters evaluated in the total design and manufacturing environment of composite parts.

The objective of an engineering analysis and the associated numerical model and simulator for a manufacturing process—especially with advanced composite material—is to predict how important design and manufacturing parameters such as material, surface topology, layup strategy, and plies stacking impact the behavior of the final product in term of performances and cost.

The possibility to model how the composite material can simultaneously obey to the design criteria in terms of surface topology, fiber orientation, allowable fiber distortion, fiber wrinkling, thickness distribution, fiber strain, and constraints coming from the manufacturing process such as forming temperature, material tension, inner ply, forming propagation wave, pressure mapping control, and contact area empowers designers and manufacturers to test new forming strategies and materials against design criteria while looking for the optimum combination material-design-manufacturing equipment to ensure the desired production rate and part quality.

FIELD OF THE INVENTION

The present invention relates to composite part design and manufacturing and the robotic machines used to perform such work.

Simulation allows designers to see the implications of their design and material choices and/or any changes to the design, material, tooling, or process parameters on the costs of manufacturing and layup quality. By understanding these conditions, engineers can decide upon the most cost-effective material-design-tooling-manufacturing strategy to be used in final production. Traditionally Engineers import design data and resource information from CAD/CAM, FEA, etc. and important aspects such as material manufacturability, tooling or manufacturing process are often not taken into account during the process simulation. The composite forming industry still heavily relies heavily on tedious, costly and extensive trial- and error runs on the shop floor to improve the process. Being able to simulate inner ply interaction is crucial to properly simulate material defects such as wrinkles, bridging, fiber distortions, material stretching, etc.

SUMMARY OF THE INVENTION

The objective of an engineering analysis and the associated numerical model and simulator for a manufacturing process, especially with advanced composite material, is to predict how important design and manufacturing parameters such as towpath starting points, stagger and offset of starting points, orientation angle, intermediate surfaces, polynomial discretization, and towpath look-ahead impact the behavior of the final product in term of performances and cost.

Our starting point optimizer is a multidisciplinary manufacturing analysis tool that provides designers with the capability to fully model material behavior during the computation of manufacturing process strategies for advanced automated layup technologies such as Tape layer, Fiber Placement and Robotics. The possibility to model how the composite material can obey simultaneously to the design criteria in term of surface topology, fiber direction, angle, gap/overlap and constraints coming from an automated material layup processes such as material compaction, layup temperature, material tension, feed-rate, machine kinematics empower designers to test advanced composite materials against new or existing designs looking for the optimum combination material-manufacturing equipments ensuring the desired production rate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENT

The Optimum Starting Point

Figure 1:
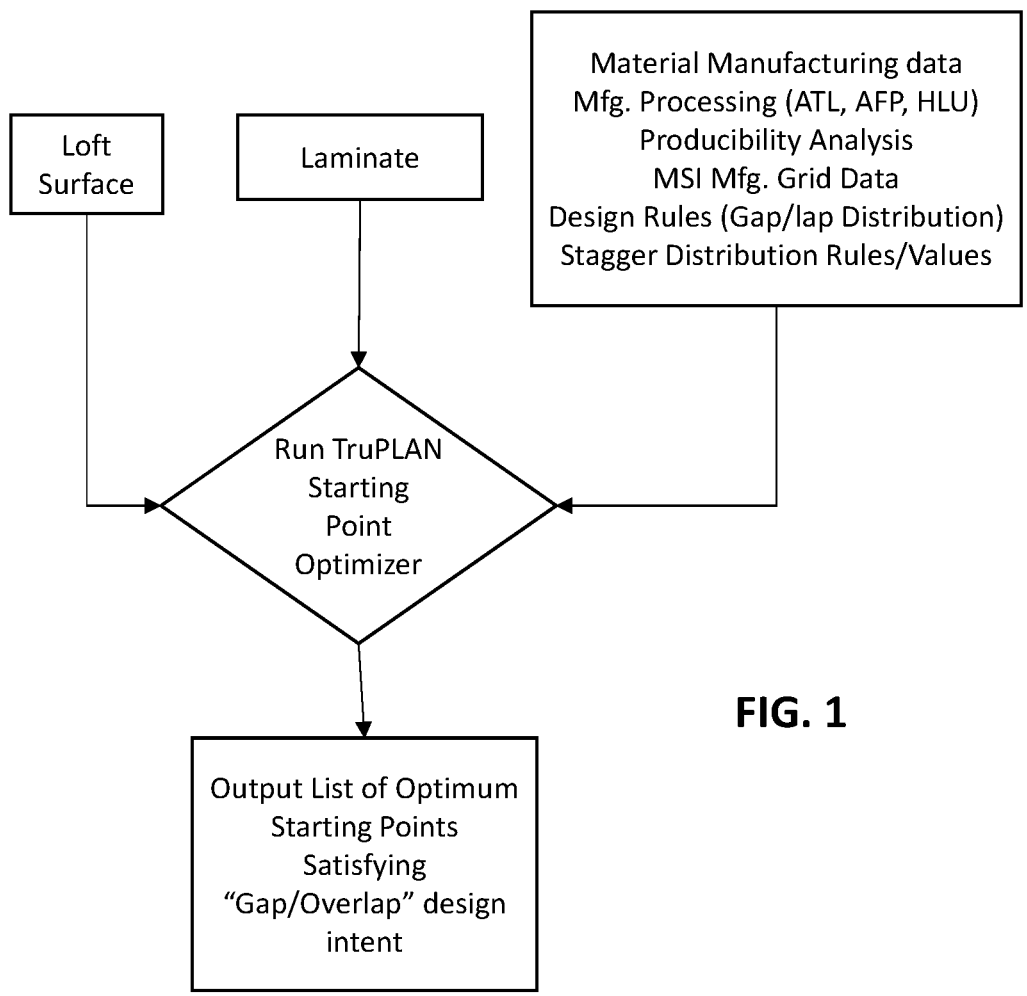
FIG. 1 is a flow diagram for the generating and analyzing optimum starting points for tow paths of laminate materials.

One of the most difficult challenges during fiber path generation for advanced material layup technologies hand-layup and/or automated material layup such as Fiber Placement, Tape Layer, Robotics is the location of the initial starting point necessary for the computation of fiber paths for the initial layer.

The intent of this algorithm is to optimize the location of the initial starting point to prevent "Gap/Overlap" occurring at the same location for plies having the same orientation.

A composite part is made of different layers of composite material forming a laminate. Each ply is defined by a boundary (closed curve) limiting the surface regions where the composite material will be applied, an orientation defining the material angle direction and a starting point.

In order to cover plies with composite material using advanced technologies such as Fiber Placement, Tape Layer, Robotics multiple towpaths or fiber paths have to be computed.

Due to a variation in surface curvature or any discontinuities such as ramps, radii, build-up, pad-up, surface tapering etc., the towpath or fiber path computed for each plies present "Gap/Overlap".

In fact it is not possible to compute fiber paths having a constant "Gap/Overlap" and same fiber orientation if the fiber paths have to cross surface regions presenting discontinuities as described above (surface curvature variation, fillet radii, ramps, build-up, surface tapering etc. . . . ).

The gaps or overlaps present between towpaths or fiber paths belonging to a ply cause material fiber discontinuities plus areas of material voids (Gap) or excess (Overlap) impacting significantly the mechanical performances and part quality.

The main design intent for composite parts is to prevent "Gap/Overlap" occurring at the same location for plies having the same orientation across the all ply stack or laminate.

A common technique called "ply staggering" has been applied to control the position of gaps and overlaps. This technique is simply based on creating an initial starting point to compute fiber paths for the first ply or layer, and using as starting points for computation of fiber paths for all other plies included in the laminate, points that are the result of staggering or offsetting the initial starting point. Having starting points computed as an offset or stagger from a common initial starting points, is a simple way to prevent other fiber paths from belonging to different plies or layers included in the laminate have "Gaps/Overlaps" occurring at the same locations.

Unfortunately this simple technique based on staggering or offsetting the initial starting point is not enough to prevent Gap/Overlap occurring at the same location for plies having same orientation, because the amount of offset or stagger that can be applied to the initial starting point, it is limited by the tow width or material layup band in general.

Basically there is a finite number of starting points that can be computed as an offset for the initial starting point, so it is impossible to properly control "Gap/Overlap" distribution in a laminate using a simple offsetting or staggering technique.

The innovative optimization method described hereafter, it is not solely based on a stagger or offset of the initial starting point but it uses a "look-ahead" to modify the fiber angle direction in order to prevent "Gap/Overlap".

In principle this method will allow towpaths or fiber paths to locally slightly deviate from the desired fiber direction, in accordance with design tolerance and material manufacturing limits (steering, wrinkle, bridging, compaction, angle deviation etc.) to prevent "Gap/Overlap" occurring at the same location across all laminates that cannot being prevented using a simple initial starting point stagger or offset.

Within this method a computational loop will be launched in order to use initial starting point stagger and fiber direction look-ahead to optimize the position of the initial starting point and to define surface regions inside all laminate where the fiber direction has to be varied in accordance to design intent tolerance, to minimize the number of Gap/Overlap and to avoid Gap/Overlap occurring at the same location for plies sharing the same orientation.

Figure 2:
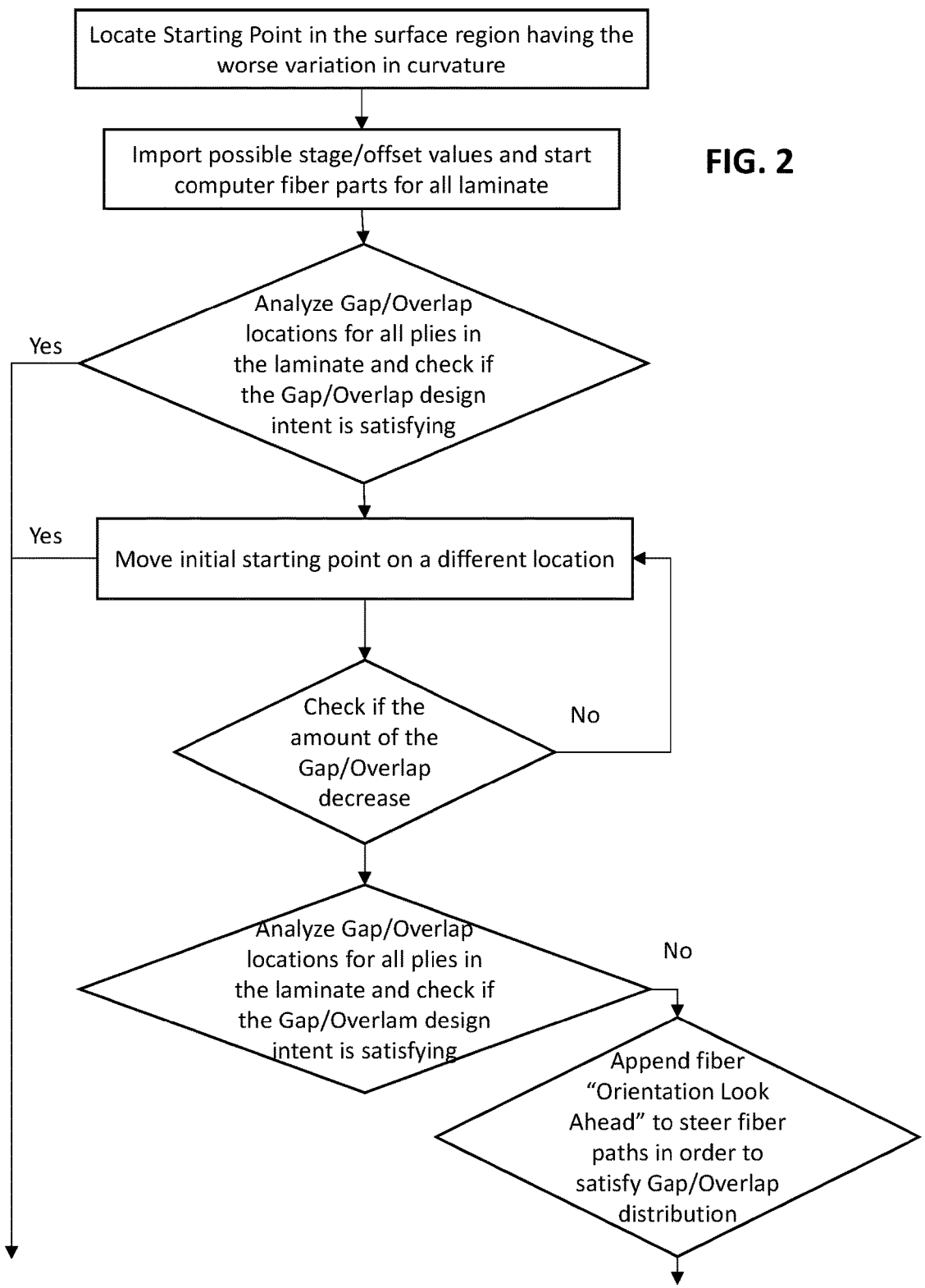
FIG. 2 is a flow diagram for the iterative method of analyzing optimum starting points to avoid and or minimize gaps and overlaps in the laminate materials.

Basically this innovative method is shown in FIG. 1 and FIG. 2.

Advanced Surface Offset

One of the most difficult challenges during fiber path generation for advanced material layup technologies handlayup and/or automated material layup such as Fiber Placement, Tape Layer, Robotics is the computation of "Intermediate Surfaces" representing surface topology after material layers have been applied.

This Advanced Surface Offset method uses three major improvements to create Intermediate Surfaces:
  i. An advanced polynomial discretization method it is used to described mathematically each surface.
     The main benefits of the polynomial discretization method is the computational speed at which Intermediate surfaces can be computed, in fact by using a polynomial discrete approach Intermediate Surfaces can be computed extremely fast in comparison to traditional CAD systems based on NURBS.
     Also the polynomial discrete approach allows one to project ply boundary curves into Intermediate Surfaces extremely fast in comparison to traditional CAD systems based on NURBS.
     This significantly reduces the enormous time currently spent today to compute Intermediate Surfaces and ply boundary association commonly called "Skin-Swap".
  ii. This method based on polynomial discretization allows blending surface regions representing zones at different thickness. The user can specify as input a blending radius, in order to control the "surface smoothness" in regions presenting ramps due to zones having different thickness. In this way the user can create an intermediate surface for design intent or for manufacturing intent where it is fundamental to have a very high continuous intermediate surface to prevent bad machine motion resulting in material layup defects (bridging, wrinkling, steering, gap/overlap, fiber deviations . . . ).
  iii. This method starts from the same original surface used during FEA analysis to compute the ply stacking sequences and plies area to ensure structural integrity and mechanical performance.
     This algorithm allows importing the FEA surface in the form of a mesh or CAD model. This surface contains all the boundaries describing for each plies the coverage area necessary to ensure structural integrity and mechanical performance.
     Starting from this original FEA surface, Intermediate Surfaces will be computed offsetting the original surface along its normal vectors of the proper amount defined by the material thickness and the specific number of layers.
     Starting from the FEA surfaces it guarantees to preserve the ply coverage area needed for structural integrity and mechanical performance and to send warnings in the case the ply coverage area is increased causing the part to be heavier or decreased causing a failure in mechanical performances.

Multilayer Steering Fiber Path

Traditionally composite parts are made of laminates constructed from multiple layers of fiber-reinforced material. For each layer, the fiber direction follows a design variable called orientation angle. The orientation angle is the same for the all layer or ply.

Recently, it has been shown that even greater use of fiber-reinforced materials can be achieved by varying spatially throughout the layer or ply the orientation angle, generating what is called a steered fiber path increasing significantly the stiffness and overall mechanical performances.

Two major limitations have prevented this technique to be successfully applied:

Material Steering allowable

Material allowable for part certification

The innovative "Multilayer Steering Fiber Path" resolves the limitations above motioned, it allows one to incorporate material properties such as steering limits, material wrinkle, material bridging, material compaction during the computation of towpaths or fiber paths ensuring part manufacturability. Also within this method fiber paths belonging to different layers forming the laminates, they will be steered in a way that at any point across the entire composite laminates, if I imagine to drill a hole passing through the all laminates thickness, the angle distribution, locally to the inspection point, it will respect engineering material allowable based on a combination of 0°/90°/±45° angular direction. Basically the fiber paths computed for each layer of the laminate can be steered or curved to follow any reference curve(s) or to interpolate any angular distribution on a layer by layer basis in order to maximize part stiffness and minimize weight, however the reference curve(s) or the angular distribution has to be computed in a way that the fiber path do not exceeds material limits in term of steering, wrinkle, bridging, angular deviation, compaction and the angular distribution across the all thickness of the laminate at each points of the laminates is a combination of 0°/90°/±45° angles machining the angular distribution used to compute composite material allowable.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for optimizing composite part manufacturing strategies so as to maximize strength, minimize material costs, and increase manufacturing speeds using a computational device, the method comprising:

importing loft surface information;

importing laminate information;

importing material manufacturing data;

executing a starting point optimizer;

generating a list of optimum starting points;

analyzing the list of optimum starting points for gap and overlap outcomes; and generating a list of the optimum starting points and the associated gap and overlap outcomes;

sorting the list of the starting points and associated gap and overlap outcomes in accordance with user selectable parameters;

displaying the list of the starting points and associated gap and overlap outcomes on a user readable device; and exporting the list to a manufacturing system.

2. A method as in claim 1 for optimizing composite part manufacturing strategies, the method further comprising:

generating a mathematical description of each surface using an advanced polynomial discretization method;

using the polynomial discretization method to project ply boundary curves into intermediate surfaces;

using the intermediate surfaces to blend surfaces of adjacent zones together to control surface smoothness; and and exporting the information to a manufacturing system.

* * * * *